Sept. 22, 1964 T. GISLASON 3,149,475

HEAD PRESSURE CONTROL FOR REFRIGERATION SYSTEM

Filed May 11, 1962 2 Sheets-Sheet 1

INVENTOR
THORSTEINN GISLASON
BY Cohn and Powell
ATTORNEYS

United States Patent Office 3,149,475
Patented Sept. 22, 1964

3,149,475
HEAD PRESSURE CONTROL FOR REFRIGERATION SYSTEM
Thorsteinn Gislason, St. Louis, Mo., assignor to Sporlan Valve Company, St. Louis, Mo., a corporation of Missouri
Filed May 11, 1962, Ser. No. 194,091
3 Claims. (Cl. 62—197)

This invention relates generally to improvements in a head pressure control, and more particularly to improvements in a refrigeration system in which the liquid pressure of the refrigerant is maintained at a predetermined minimum value.

In refrigeration systems, it is important to maintain a minimum liquid refrigerant pressure to assure sufficient feeding of the evaporator. This is particularly true in a system that utilizes an air-cooled condenser because the liquid pressure falls to an insufficient value during periods of cold ambient air unless some method is applied to maintain a minimum liquid pressure.

One known method of obtaining the above desired result is to restrict the drainage from the condenser, and thereby reduce the effective condensing surface until sufficiently high condensing pressure is reached in spite of the low ambient air temperature. However, such flooding of the condenser circuits will then cause a liquid subcooling to a degree that approaches the cooling air temperature. Because the liquid receiver, in normay operation, must contain both liquid and vapor, the receiver pressure is bound to correspond to the temperature of the liquid in the receiver. Unless corrected, as by the present invention, the receiver pressure will fall in response to the cooling effect of the sub-cooled liquid from the flooded condenser.

It is an important object to provide a control device that diverts a flow of hot gas from the compressor discharge, by-passing the condenser, into the sub-cooled liquid draining from the condenser, whereby when combined the sub-cooling is removed from the condenser liquid and the hot gas flowing through the by-pass line is condensed to maintain the pressure of the refrigerant liquid in the receiver.

An important object is achieved by the provision of a three-way control valve adapted to regulate the flow of the compressor discharge gas simultaneously and selectively into the condenser and/or the condenser by-pass line in response to the pressure of the receiver so as to maintain the predetermined minimum refrigerant liquid pressure.

Another important objective is realized by the control device in that it closes off the flow from the compressor to the condenser entirely during startup of the system when the ambient air temperature is cold, and diverts the flow around the condenser directly to the receiver, the control device keeping the condenser inlet closed until the receiver pressure has been brought up to the predetermined minimum value. Accordingly, the full compressor capacity is used to establish the operating pressure essentially without delay.

If the control device were lacking in the system, the receiver pressure would not be raised to the operating limit during startup until the condenser had been flooded sufficiently to raise the condenser pressure too. While operating with insufficient liquid pressure, the system is likely to run with abnormally low suction pressure and therefore reduced capacity, and thereby slowing the process of building up the liquid line pressure.

Still another important objective is afforded by the provision of a control device having an inlet connected to the compressor discharge, a first outlet connected to the condenser inlet, a second outlet connected to the condenser outlet and receiver, and valve means regulating flow between the device inlet and the two outlets in response to pressure at the receiver.

An important object is realized by the structural arrangement of the valve means so that the pressure at the device inlet tends to maintain the valve means in a balanced condition, and by the provision of means exerting a predetermined pressure on the valve means tending to close a first valve port and to open a second valve port upon a decrease in pressure at the receiver exerted on the valve means below the said predetermined pressure, and tending to open the first valve port and to close the second valve port upon an increase in the pressure at the receiver above said determined pressure.

Another important objective is achieved by constructing the valve means with a valve member on the outlet side of each valve port and subjected respectively to the pressure at the associated device outlet, the valve members being subjected to the device pressure at the inlet tending to maintain the valve members in a balanced condition, by providing means connected to the valve means to balance substantially the pressure at the first outlet exerted on the first valve member, and by providing means that exerts a predetermined pressure on the valve means tending to close the first valve port by the first valve member and to open the second valve port by the second valve member upon a decrease in pressure at the device second outlet exerted on the said second member below the predetermined pressure, and tending to open the first valve port by the first valve member and to close the second valve port by the second valve member upon an increase in the pressure at the device second outlet exerted on the second valve member above the predetermined pressure.

Yet another important object is provided by the provision of a flexible motor element operatively connected to the valve members and subjected to the pressure at the first outlet and substantially balanced by the same pressure on the first valve member.

An important objective is achieved by constructing the valve ports between the device inlet and the pair of outlets of substantially equal effective areas and by constructing the flexible motor element with substantially the same effective area as each of the valve ports. With this arrangement, pressure exerted on the valve members through the device inlet tends to maintain the valve members in a substantially balanced condition, and the pressure at the first outlet corresponding to the condenser inlet is exerted on the flexible motor element and is balanced by the same pressure exerted on the first valve member. This arrangement assures that movement of the valve members is influenced solely by the pressure differential existing between the predetermined pressures exerted on the valve members and the receiver pressure exerted on the second valve member at the second outlet.

Other important advantages are realized by placing an air charge on one side of the flexible motor unit to provide the predetermined pressure that opposes the receiver pressure on one of the valve members, the pressure differential actuating the valve members.

Furthermore, a resilient means such as a spring can be utilized on one side of the flexible motor element in lieu of an air charge to exert this predetermined pressure. In this event, an adjustable element can be provided to condition the compressive force of such spring and thereby selectively determine such pressure accurately.

An important objective is realized by the structural arrangement of the valve members and interconnecting stem to provide a unit that moves in unison relative to the pair of associated valve ports, and by the arrangement of such valve members relative to the ports and to the outlet chambers such that the pressure variations in the inlet chamber and in one outlet chamber have no effect upon the positioning of the valve members but rather the actuation of the valve members is controlled directly by pressure variations in the second outlet chamber responsive to receiver pressure.

It is an important object to provide a head pressure control that is simple and durable in construction, economical to manufacture and assemble, highly efficient in operation, and which is fully automatic when installed.

The foregoing and numerous objects and advantages of the invention will more clearly appear from the following detailed description of a preferred embodiment and a modification thereof, particularly when considered in connection with the accompanying drawings, in which.

Figure 1:
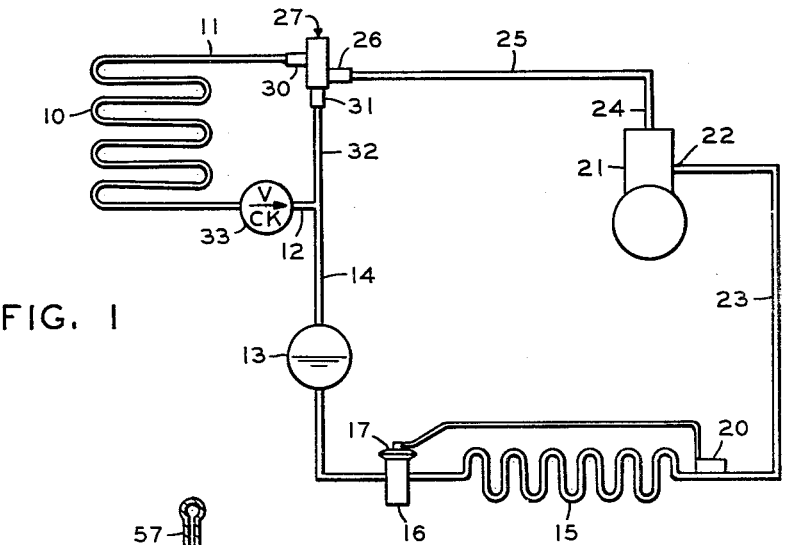
FIG. 1 is a diagrammatic view of the refrigeration system.

Referring now by characters of reference to the drawings, and first to FIG. 1, it is seen that the refrigeration system includes a condenser 10 having an inlet 11 and an outlet 12, the outlet 12 being operatively connected to a receiver 13 by a conduit 14 so as to receive refrigerant therefrom.

An evaporator 15 is connected through a pressure reducing device 16 to the receiver 13. The pressure reducing device 16 may be of any suitable type such as a thermostatic expansion valve operable in response to a motor unit 17 having a thermal sensing bulb 20 located in thermal relation at the outlet of the evaporator 15.

A compressor 21 includes an intake 22 connected by suction line 23 to the outlet of evaporator 15. The compressor discharge 24 is connected by a conduit 25 to the inlet 26 of a head pressure control device generally indicated at 27. As is clearly shown in FIG. 1, the control device 27 includes a first outlet 30 operatively connected to the condenser inlet 11, and includes a second outlet 31 operatively connected to conduit 14 at the condenser outlet 12 through a by-pass line 32.

A check valve 33 is connected just ahead of the condenser outlet 12 to restrict the drainage from the condenser 10. When the condenser 10 is air cooled, it is important to maintain the liquid refrigerant pressure in receiver 13 at a minimum value to assure sufficient feeding of the evaporator 15. To preclude the pressure from decreasing to an insufficient value during period of cold ambient air, the check valve 33 restricts the drainage from the condenser 10 to reduce the effective condensing surface until sufficiently high condensing pressure is reached in spite of the low ambient air temperature. This flooding of the condenser 10 will then result in liquid sub-cooling to a degree which approaches the cooling air temperature.

It will be readily understood that the receiver 13, in normal operation, must contain both liquid and vapor, and that the receiver pressure is directly related to the temperature of the liquid in the receiver 13.

The control device 27 delivers a flow of hot gas through the by-pass line 32 under selective conditions from the compressor discharge 24 and into the sub-cooled liquid draining from the condenser outlet 12. When so combined, the sub-cooling of the liquid draining from the condenser is removed and the hot gas is condensed, thereby maintaining the pressure of the refrigerant in the receiver 13 and preventing any pressure decrease because of any cooling effect created by the sub-cooled liquid from the flooded condenser 10.

Figure 2:
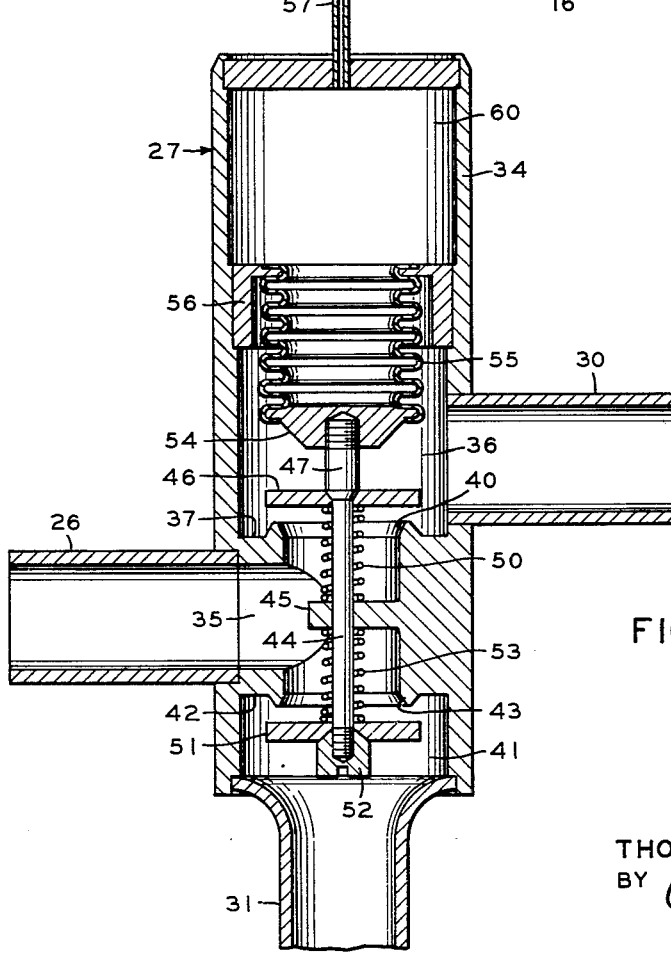
FIG. 2 is an enlarged cross sectional view of the control device utilized in the system of FIG. 1.

The construction of the control device 27 is more clearly illustrated in FIG. 2. It is seen that the control device 27 includes a cylindrical body 34 having an inlet chamber 35 communicating with the inlet 26 that is operatively connected through conduit 25 to the compressor discharge 24. The inlet chamber 35 is subjected to the compressor discharge pressure.

Located above the inlet chamber 35 is a first outlet chamber 36 having a first outlet 30 operatively connected to the condenser inlet 11. Consequently, the first outlet chamber 36 is subjected to the condenser inlet pressure.

Extending across the interior of body 34 is a partition 37 located between the inlet chamber 35 and the first outlet chamber 36. The partition 37 includes a valve port 40 that places the inlet chamber 35 and first outlet chamber 36 in communication for directing flow from the compressor discharge 24 to the condenser inlet 11.

Located below the inlet chamber 35 is a second outlet chamber 41 having a second outlet 31 that operatively communicates with the by-pass line 32. It is seen that the second outlet chamber 41 is subjected to the receiver pressure. Another partition 42 extends across the interior of body 34 between the inlet chamber 35 and second outlet chamber 41, the partition 42 provided with a valve port 43 for directing flow from the compressor discharge 24 to the by-pass line 32 and hence to the receiver 13.

For reasons which will later appear, the valve ports 40 and 43 have substantially the same effective area.

The valve means for controlling flow of the refrigerant through the control device 27 includes an elongate stem 44 reciprocatively mounted in an internal body ledge 45 projecting into the inlet chamber 35, the valve stem 44 extending vertically through the valve ports 40 and 43.

A valve member 46 is carried by one end of stem 44, the valve member 46 being located in the first outlet chamber 36 and adapted to open and close the valve port 40 upon reciprocation of the stem 44. The valve member 46 abuts an enlarged head portion 47 provided at one end of stem 44. A spring 50 is located about the stem 44 between the valve member 46 and the body ledge 45, the spring holding the valve member 46 against the head portion 47. It will be noted that the valve member 46 is subjected to the pressure in the first outlet chamber 36 which corresponds to the condenser inlet pressure.

Another valve member 51 is carried by the other end of stem 44, the valve member 51 engaging a cap 52 threadedly attached to the stem 44. A spring 53 is located about the stem 44 between the body ledge 45 and the valve member 51, the spring 53 holding the valve member 51 in its outermost position against the cap 52. It will be noted that the valve member 51 is located in the second outlet chamber 41 and is adapted to open and close the valve port 43.

The springs 50 and 53 do not affect the openings of the ports in any way, such spring being weak and used to reduce the danger of valve chatter or rattle. It will be obvious that the pressure difference across the valve will hold the closing discs in place with much more force than the springs can exert.

The valve member 51 is subjected to the pressure in the second outlet chamber 41 which corresponds to the receiver pressure.

Threadedly attached to the stem head portion 47 in the first outlet chamber 36 is a plate 54 that is attached to the lower end of a bellows 55 constituting a flexible motor element. The upper end of bellows 55 is open and is secured to an annular collar 56 attached to the body 34. The outside of bellows 55 is subjected to the pressure in the first outlet chamber 36 which corresponds to the condenser inlet pressure. The bellows 55 is selected to have substantially the same effective area as each of the valve ports 40 and 43. The term "effective area" as applied to a bellows is an accepted technical term. It is approximately equal to the means of the areas of the inner and outer convolutions. In operation, the pressure times the effective area equals the force exerted by the gas on the bellows. The pressure in the first outlet chamber 36 tends to collapse the bellows 55 and hence opposes directly the same pressure exerted on the valve member 46. Because bellows 55 has the same effective area as the port 40 any variation in pressure in the first outlet chamber 36 will have no effect upon the movement of the valve members 46 and 51. These equal and opposite forces on bellows 55 and valve member 46 cancel one another, and thus it is seen that the pressure in condenser inlet 11 and chamber 36 has no effect on the operation of the control device 27.

Similarly, it is seen that the pressure corresponding to the compressor discharge pressure in the inlet chamber 35 is exerted equally on the valve members 46 and 51, thereby tending to hold the valve members 46 and 51 in a balanced condition as is shown in FIG. 2. It is seen that any variation in the compressor discharge pressure in the inlet chamber 35 will have no effect upon the movement or position of the valve members 46 and 51 because the opposite and equal forces cancel one another, and thus has no effect on the operation of device 27.

The inside of bellows 55 is provided with an air charge that exerts a predetermined pressure on the valve stem 44 tending to move the valve member 46 in a direction to close port 40 and to move valve 51 in a direction to open valve port 43. This air charge is introduced through tube 57 into chamber 60. After the introduction of the air charge to provide the selective predetermined pressure, the tube 57 is sealed off.

With this structural arrangement, the pressure in the second outlet chamber 41 is directly opposed by the predetermined pressure of the air charge on the inside of bellows 55. The movement of the valve stem 44 and the associated valve members 46 and 51 is influenced therefore by the pressure in the second outlet chamber 41 which corresponds to the receiver pressure, such receiver pressure tending to close the port 43 and open the port 40 upon an increase, and tending to close the port 40 and to open the port 43 upon a decrease. The sole pressure influencing the control device's 27 operation is the pressure in receiver by-pass line 32 or in valve chamber 41, which is generally not the same as the pressure in condenser inlet 11. With a pressure in chamber 35 which is always greater than the pressure in the outlet chambers 36 and 41, the assembly of elements 44, 46, 47, 51 and 52 can be considered a solid member. Since this is the case, then the pressure in the outlet 41 can operate in direct opposition to the gas pressure on the inside of bellows 55.

Figure 3:
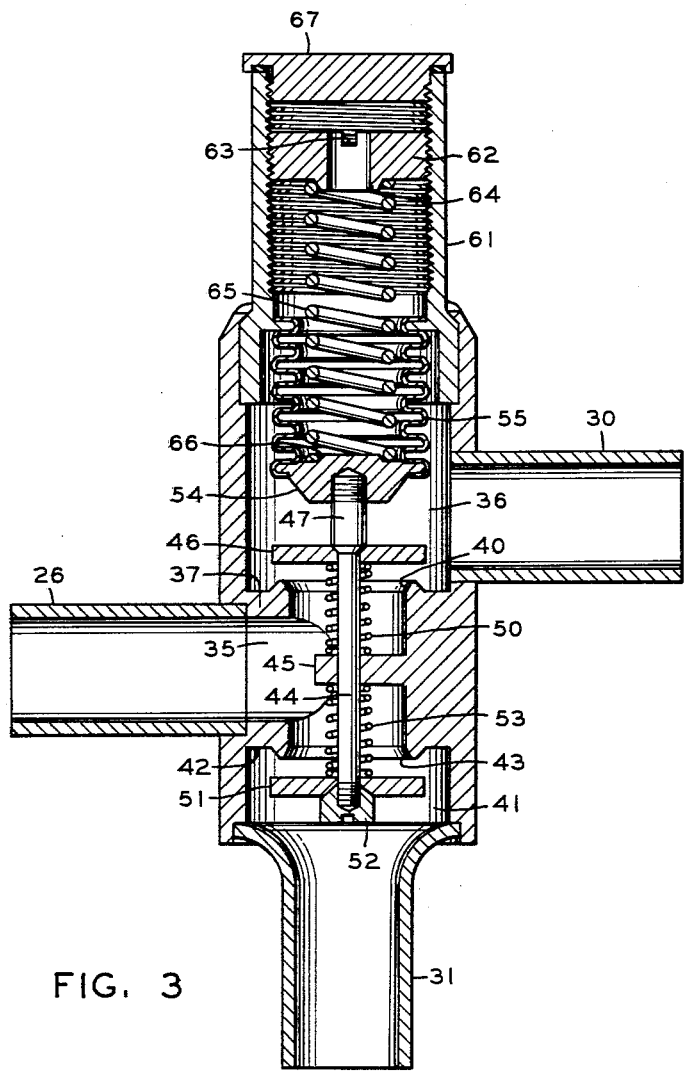
FIG. 3 is a cross sectional view of a modified control device.

A slightly modified construction of the control device 27 is illustrated in FIG. 3. All of the component parts of this modified construction which are illustrated also in FIG. 2 are given corresponding reference numerals. The only change is in the manner by which the predetermined pressure is exerted on the one side of the bellows 55 and therefore, those elements disclosed in FIG. 3 relating to this feature are now described in detail.

For example, the upper end of bellows 55 is open and attached to an inturned collar formed internally of an elongate tubular portion 61 attached to the top of body 34. The inside of tubular portion 61 is threaded to receive a traveling nut 62. The upper end of nut 62 is provided with a slot 63 adapted to receive the end of a suitable tool such as a screw driver to facilitate turning of the nut 62 in order to position the nut 62 threadedly along the tubular portion 61.

The underside of nut 62 is provided with a projecting boss 64 that positions the upper end of a compression spring 65 located in the tubular portion 61. The lower end of spring 65 abuts the bellows plate 54 and is positioned on a similar boss 66. The spring 65 exerts a predetermined pressure on the stem 44 and tends to move the stem 44 and its associated valve members 46 and 51 in a downward direction, such compressive force being directly opposed by the pressure exerted on valve member 51 in the second outlet chamber 41. Of course, the compressive force of spring 65 can be varied selectively by positioning the nut 62 as explained above.

The upper end of tubular portion 61 is closed by a lid 67 that is threadedly attached. The lid 67 can be easily removed to gain access to the nut 62 in order to adjust its position if desired, and then can be easily replaced.

It is thought that the operation of the control device 27 and its functional advantages in the refrigeration system have become fully apparent from the foregoing detailed description of parts, but for completeness of disclosure, the function will be briefly described at this point.

It will be assumed that the control device 27 is connected in the refrigeration system as is illustrated in FIG. 1. During startup of the refrigeration system when the ambient air temperature of the condenser 10 is cold, a ihghly important aspect of this invention is realized in that the control device 27 closes off the flow from the compressor 21 to the condenser 10 until the receiver pressure has been brought up to the predetermined minimum value. The control device 27 will not permit any premature opening into the condenser inlet 11 during startup. Consequently, the full compressor capacity is used to establish the operating pressure without delay.

As the pressure in the second outlet chamber 41 in the control device 27 decreases below a predetermined operating value defined by the predetermined pressure exerted by the air charge in the embodiment of FIG. 2 and by the compressive force of spring 65 in the embodiment of FIG. 3, the valve means will tend to move downwardly such as the valve member 46 closes the port 40 and the valve member 51 opens the port 43. This valve action reduces or stops the flow of hot gas from the compressor discharge to the condenser inlet and permits a flow of hot gas from the compressor discharge directly into the by-pass line 32. The hot gas removes the subcooling of the liquid draining from the condenser outlet 12, and the hot gas is condensed. This action raises the temperature of the liquid in the receiver 13 and consequently raises the receiver pressure.

Upon an increase in the receiver pressure and a responsive increase of pressure in the second outlet chamber 41 above the predetermined minimum value and above the predetermined pressure exerted by the air charge (FIG. 2) or the spring force (FIG. 3), the receiver pressure will tend to move the valve means in a direction so that the valve member 51 closes valve port 43 and so that the valve member 46 opens the valve port 40. This action reduces or stops the flow of the hot gas from the compressor discharge into the by-pass line 32 and permits a flow of the hot gas from the compressor discharge into the condenser inlet 11 through the first outlet chamber 36.

It is seen that the three-way control valve 27 regulates the flow of the compressor discharge gas simultaneously into the condenser 10 and or into the condenser by-pass line 32, in response to the pressure of the receiver 13 so as to maintain a predetermined minimum refrigerant liquid pressure.

In view of the fact that a three-way control device 27 is utilized, constituting a single item in the system, it is practical to apply an air charge on the bellows 55 or in other words, on the sensing flexible motor element, which in turn makes it possible to obtain full valve action with only a slight change in the controlled pressure. The practical advantage appears both in the fact that the device 27 permits no premature opening into the condenser inlet during startup, and also in the fact that the predetermined minimum operating pressure is essentially independent of the system's capacity.

A further advantage is that the control devices shown in FIGS. 2 and 3 will not permit any pressure pulsations being transmitted from the compressor 21 to flex the bellows 55 because of the balanced port design, and therefore tends to reduce or eliminate bellows failure because of fatigue.

The particular structural arrangement of the control device 27 enables the use of an air charge to provide the predetermined pressure exerted by the bellows, and provides a unit in which there would be no loss of refrigerant charge in the event of any bellows failure.

By utilizing either of the single three-way control devices disclosed in FIG. 2 or FIG. 3, the compressor discharge pressure, which effects operating costs, will never exceed the liquid line pressure by more than a normal pressure drop through the components.

Although the invention has been described by making detailed reference to a preferred embodiment and a modification thereof, such detail is to be understood in an instructive, rather than in any restrictive sense, many variants being possible within the scope of the claims hereunto appended.

I claim as my invention:

1. In a refrigerating system:
   (a) a condenser having an inlet and an outlet, a receiver connected with the outlet of the condenser, an evaporator connected with the receiver to receive refrigerant therefrom, an expansion means at the intake to the evaporator, a compressor having an intake and a discharge, the said compressor intake being connected to the evaporator,
   (b) a control device comprising an inlet connected to the compressor discharge, a first outlet connected to the condenser inlet,
   (c) a first valve port between the device inlet and first outlet,
   (d) a second outlet connected to the condenser outlet and receiver,
   (e) a second valve port between the device inlet and second outlet,
   (f) valve means including a first and a second valve member operatively interconnected and associated operatively respectively with first and second valve ports, said first and second valve members having opposed outwardly facing surfaces subjected respectively to the pressures at the first and second outlets, said valve members having opposed inwardly facing surfaces subjected to the pressure at the device inlet tending to maintain the valve members in a substantially balanced condition, so that the pressure at the device inlet has no effect on the operation of the control device,
   (g) a flexible motor element operatively connected to the valve members, the motor element being subjected to the pressure at the first outlet and substantially balanced by the same pressure on the first valve member so that the pressure at the first outlet has no effect on the operation of the control device,
   (h) means exerting a predetermined pressure on said valve means tending to close the first valve port by said first valve member and to open the second valve port by the second valve member upon a decrease in pressure at said second outlet exerted on said second valve member, and tending to open the first valve port by said first valve member and to close the second valve port by said second valve member upon an increase in the pressure at said second outlet exerted on said second valve member.

2. In a refrigerating system:
   (a) a condenser having an inlet and an outlet, a receiver connected with the outlet of the condenser, an evaporator connected with the receiver to receive refrigerant therefrom, an expansion means at the intake to the evaporator, a compressor having an intake and a discharge, the said compressor intake being connected to the evaporator, and
   (b) a control device comprising a body having an intake chamber with an inlet connected to the compressor discharge,
   (c) a first outlet chamber having a first outlet connected to the condenser inlet,
   (d) a first valve port between the inlet chamber and said first outlet chamber,
   (e) a second outlet chamber having a second outlet connected to the condenser outlet and receiver,
   (f) a second valve port between the inlet chamber and said second outlet chamber, said valve ports being of substantially equal size,
   (g) valve means including a first and a second valve member operatively interconnected and associated operatively respectively with said first and second valve ports, said first and second valve members having opposed outwardly facing surfaces subjected respectively to the pressures in said first and second outlet chambers tending to close said first and second valve ports, said valve members having opposed inwardly facing surfaces subjected to the pressure at the device inlet tending to maintain the valve members in a substantially balanced condition so that the pressure at the device inlet has no effect on the operation of the control device,
   (h) a flexible motor element having substantially the same effective area as said ports operatively connected to said valve members, the flexible motor element being subjected to the pressure in said first outlet chamber and substantially balanced by the same pressure on said first valve member so that the pressure in the first outlet chamber has no effect on the operation of the control device, and
   (i) means exerting a predetermined pressure on said valve means tending to close the first valve port by said first valve member and to open the second valve port by the second valve member upon a decrease in pressure in said second outlet chamber exerted on said second valve member, and tending to open the first valve port by said first valve member and to close the second valve port by said second valve member upon an increase in the pressure in said second outlet chamber exerted on said second valve member.

3. In a refrigerating system:
   (a) a condenser having an inlet and an outlet, a receiver connected with the outlet of the condenser, an evaporator connected with the receiver to receive refrigerant therefrom, an expansion means at the intake to the evaporator, a compressor having an intake and a discharge, the said compressor intake being connected to the evaporator, and
   (b) a control device comprising a body having an inlet connected to the compressor discharge,
   (c) a first outlet on one side of said body inlet connected to the condenser inlet,
   (d) a second outlet at the other side of said body inlet connected to the condenser outlet and receiver,
   (e) a partition provided with a first valve port between said body inlet and said first body outlet,
   (f) another partition provided with a second valve port between said body inlet and said second outlet, said valve ports being substantially of equal size,
   (g) a first valve member on the outlet side of said first valve port having an outwardly facing surface subjected to the pressure at said first outlet tending to close said first valve port,
   (h) a second valve member on the outlet side of said second valve port having an outwardly facing surface subjected to the pressure at said second outlet tending to close said second valve port, a stem interconnecting said valve members so as to move together as a unit, said valve members having inwardly opposed surfaces subjected to the pressure at the device inlet tending to maintain the valve members in a substantially balanced condition so that the pressure at the device inlet has no effect on the operation of the control device, (i) a flexible motor element attached to said stem and subjected on one side to pressure at said first outlet, said flexible motor element having substantially the same effective area as each of said valve ports tending to balance substantially the pressure at said first outlet exerted on first valve member so that the pressure at said first outlet has no effect on the operation of the control device, (j) means on the other side of said flexible motor element exerting a predetermined pressure tending to move the valve members so as to close the first port and to open the second port upon a decrease in pressure at said second outlet, and tending to open the first port and to close the second port upon an increase in pressure at said second outlet.

References Cited in the file of this patent
UNITED STATES PATENTS

| | | |
|---|---|---|
| 2,869,330 | Kramer | Jan. 20, 1959 |
| 2,874,550 | Nusson | Feb. 24, 1959 |
| 2,882,007 | Conlan | Apr. 14, 1959 |
| 2,934,911 | Micai et al. | May 3, 1960 |
| 2,954,681 | McCormack | Oct. 4, 1960 |
| 2,986,899 | Schenk et al. | June 6, 1961 |
| 3,060,699 | Tilney | Oct. 30, 1962 |